United States Patent [19]
Kool et al.

[11] Patent Number: 5,548,397
[45] Date of Patent: Aug. 20, 1996

[54] SYSTEM FOR POSITIONING A PILE DRIVING RIG OR SIMILAR INSTALLATION

[75] Inventors: Anthonie F. Kool, Tienhoven; Michiel A. Van de Griendt, Delft; Bas H. de Bruin, Houten; Gerardus N. Schepes, Gouda; Willem J. Lucieer, Voorschoten, all of Netherlands

[73] Assignee: Hollandsche Beton Groep N.V., Rijswijk, Netherlands

[21] Appl. No.: 331,172

[22] Filed: Oct. 28, 1994

[30] Foreign Application Priority Data

Oct. 28, 1993 [NL] Netherlands ............. 9301864

[51] Int. Cl.$^6$ .............. G01B 11/26; E02F 3/76
[52] U.S. Cl. ................ 356/141.1; 172/4.5
[58] Field of Search ............. 172/4.5; 356/141.1

[56] References Cited

U.S. PATENT DOCUMENTS

| | | |
|---|---|---|
| 4,136,955 | 1/1979 | Aeschlimann et al. . |
| 4,225,226 | 9/1980 | Davidson et al. . |
| 4,796,198 | 1/1989 | Boultinghouse et al. . |
| 4,830,489 | 5/1989 | Cain et al. . |
| 4,936,678 | 6/1990 | Gordon et al. ............. 356/375 |
| 5,100,229 | 3/1992 | Lundberg et al. ........... 172/4.5 |
| 5,301,005 | 4/1994 | de Vos et al. . |
| 5,367,458 | 11/1994 | Roberts et al. . |
| 5,416,321 | 5/1995 | Sebastian et al. ........... 356/4.01 |
| 5,461,473 | 10/1995 | Pratt et al. ................ 356/141.3 |

FOREIGN PATENT DOCUMENTS

| | | |
|---|---|---|
| 0288314 | 10/1988 | European Pat. Off. . |
| 0309962 | 4/1989 | European Pat. Off. . |
| 2671625 | 7/1992 | France . |
| 2186460 | 8/1987 | United Kingdom . |

Primary Examiner—Stephen C. Buczinski
Attorney, Agent, or Firm—Young & Thompson

[57] ABSTRACT

System for positioning a vehicle within a predetermined area, which system is provided with a laser transmitter/receiver and three or more laser reflectors which are located outside and/or inside the predetermined area, the position of the laser transmitter/receiver with respect to the laser reflectors being determined continuously with the aid of a method known per se. The position of a reference point on the vehicle with respect to the laser reflectors is determined continuously with the aid of the laser transmitter/receiver. The vehicle is provided with movable parts with which predetermined work can be carried out and is provided with sensors with which the position of a number of movable parts of the vehicle is measured continuously, which parts are determining for the relative position, with respect to the reference point, of the location where the said work is carried out. Furthermore, a processor is present, which is designed and/or programmed in such a way that said processor processes the output signals from the said sensors and from the laser transmitter/receiver and on the basis of said signals determines the position of the location where the work is being carried out, with respect to the laser reflectors.

21 Claims, 10 Drawing Sheets

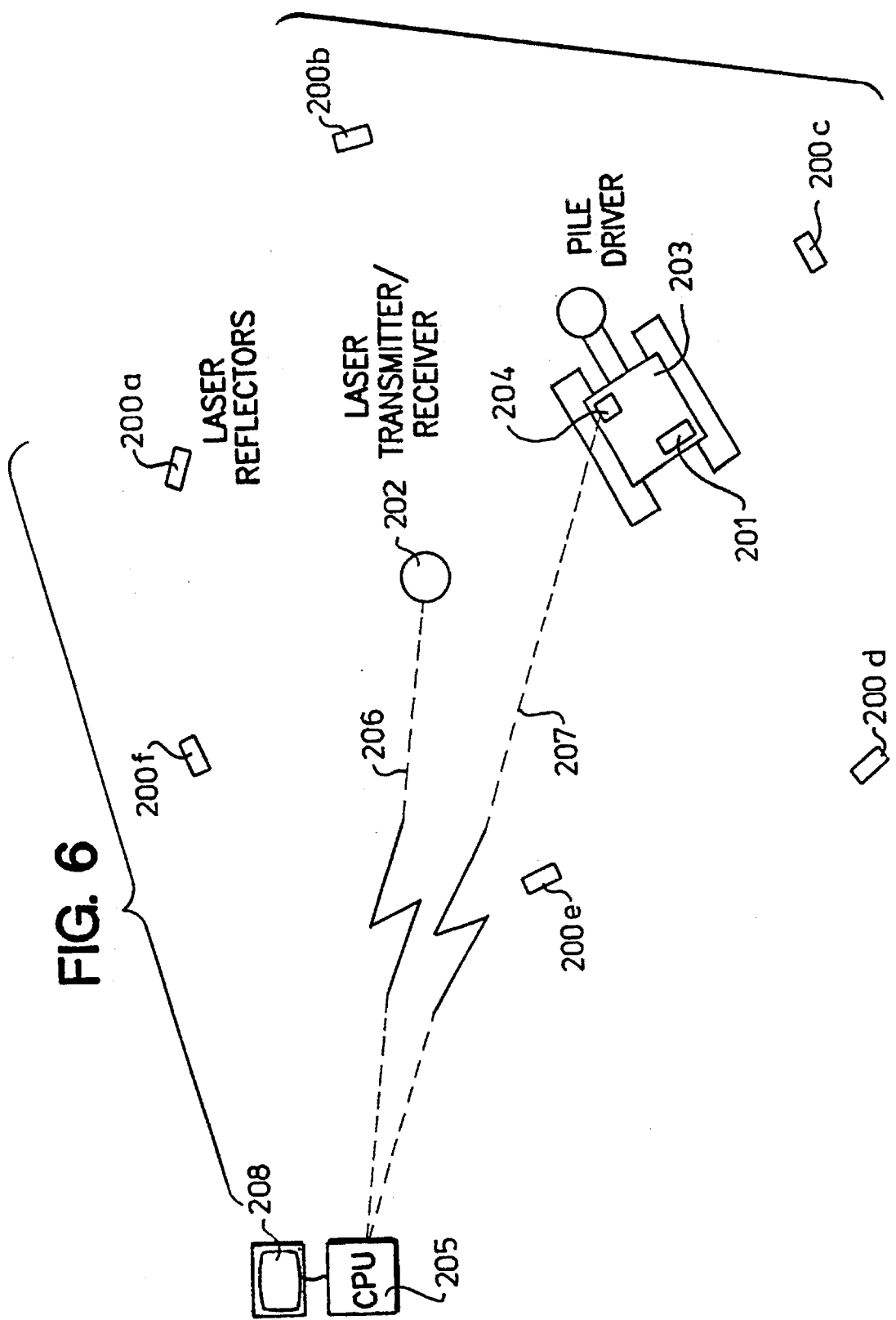

SYSTEM FOR POSITIONING A PILE DRIVING RIG OR SIMILAR INSTALLATION

The invention relates to a system for positioning a vehicle within a predetermined area, which system is provided with a laser transmitter/receiver and three or more laser reflectors which are located outside and/or inside the predetermined area, the position of the laser transmitter/receiver with respect to the laser reflectors being determined continuously with the aid of a method known per se.

A system of this type is disclosed in U.S. Pat. No. 4,796,198. In this system the vehicle is a robot vehicle which is intended in particular for transporting goods on a factory site or for transporting measuring equipment within an area hazardous to man. In this case, the laser transmitter/receiver is mounted on the vehicle and in principle is located centrally on the vehicle at a height such that the laser transmitter/receiver has a free line of sight in all directions, in particular to a number of laser reflectors which in this system are located along the boundary of the site. With the aid of the laser transmitter/receiver, the position of the centre of the vehicle with respect to the system of laser reflectors is determined continuously on the basis of trigonometric calculations in the receiver.

If a free line of sight between the laser transmitter/receiver and the laser reflectors inside or outside the predetermined area is not ensured under all circumstances, for example because obstacles are present within the area, additional laser reflectors will have to be installed in known positions in such a way that the laser transmitter/receiver can direct radiation onto at least three reflectors from every location within the area. A system of this type is described in U.S. Pat. No. 4,647,784.

A laser transmitter/receiver having improved accuracy is described in U.S. Pat. No. 5,076,690. The improvement in the accuracy is achieved by making use of special hardware in combination with control software suitable therefor.

In addition to the abovementioned general position-determining systems, further systems are known which are intended, in particular, for monitoring and controlling the work carried out by earth moving machines. In many of these systems use is made of a laser transmitter/receiver which is located in a fixed position along the boundary of a predetermined area, at least one reflector being mounted on the vehicle. Examples of systems of this type are described in FR 2,671,625, U.S. Pat. No. 4,129,224 and EP 0,145,565. In these systems the reflector is fixed to the vehicle in such a way that, in principle, only the position of a specific part of the vehicle can be controlled. This position, in turn, then forms the reference point for controlling the tools which are attached to the vehicle and which carry out the actual earth-moving work.

It has also already been proposed directly and continuously to determine the position of the vehicle concerned, in particular the shovel at the end of an articulated excavator arm, by attaching the reflector to the vehicle itself, in particular to the shovel or to a part of the excavator arm. Examples of this are described in DE 3,506,326, DE 3,006,329, EP 0,288,314, EP 0,046,854, FR 2,661,983, FR 2,508,075 and U.S. Pat. No. 3,887,012. The disadvantage of systems of this type is that the reflectors are only now and then located in the laser beam, so that information on the location can be generated only now and then. Moreover, because of the directed laser transmitter arranged in a fixed position, systems of this type are suitable only for carrying out earth-moving work in a single predetermined direction.

The aim of the invention is, now, to indicate how a vehicle which is provided with mechanisms for carrying out predetermined work can be positioned with such accuracy that, after positioning, the said work can be carried out with high accuracy.

More particularly, the aim of the invention is to indicate how a mobile pile driving rig or other similar vehicle can be positioned with such accuracy that, after positioning, the pile, the pipe, the sheet piling element or another elongated object can be introduced into the ground with the aid of the system with such accuracy that any deviation with respect to the planned ideal position is of the order of at most a few centimeters and preferably is no more than a few millimeters.

In accordance with this objective, the invention now provides a system of the type mentioned in the preamble, characterised in that the vehicle is provided with movable parts with which predetermined work can be carried out.

the position of a reference point on the vehicle with respect to the laser reflectors is determined continuously with the aid of the laser transmitter/receiver.

the vehicle is provided with sensors with which the position of a number of movable parts of the vehicle is measured continuously, which parts are determining for the relative position, with respect to the reference point, of the location where the said work is carried out, a processor is present, which is designed and/or programmed in such a way that said processor processes the output signals from the said sensors and from the laser transmitter/receiver and on the basis of said signals determines the position of the location where the work is being carried out, with respect to the laser reflectors, and there is a communication link between the sensors on the vehicle and the processor for the transfer of measured values from the sensors to the processor and in that there is a communication link between the laser transmitter/receiver and the processor for the transfer of measured values between the laser transmitter/receiver and the processor.

One embodiment of the system is characterised in that the reference point on the vehicle is provided with a laser reflector, and in that the laser transmitter/receiver is located at a predetermined position from where it is able to direct radiation onto an adequate number of laser reflectors in order to be able to determine the position of the laser reflector at the reference point from the measured values obtained. With the indicated provisos, the location at which the laser transmitter/receiver is positioned can be varied within wide limits. In particular, it is possible in this embodiment to move the laser transmitter to another location in the interim, during operation. The possessor can first determine the actual position of the laser transmitter/receiver in said new location with respect to the laser reflectors on the site and can then again be used to determine the position of the laser reflector at the reference point on the vehicle.

In another embodiment the laser transmitter/receiver is located at the said reference point on the vehicle. In this case there is no need to locate a laser reflector at the reference point.

Irrespective of the location of the laser transmitter/receiver, there is a communication link between the sensors on the vehicle and the processor for the transfer of measured values from the sensors to the processor and there is a communication link between the laser transmitter/receiver and the processor for the transfer of measured values between the laser transmitter/receiver and the processor.

In the case where the laser transmitter/receiver is not located on the vehicle, it is preferable that the communication link between the sensors on the vehicle and the processor for the transfer of measured values from the sensors to the processor is formed by a cordless communication path. If the laser transmitter/receiver is located on the vehicle it is then in many cases simpler to allow communication to proceed via cables, connected between the processor and the diverse sensors.

The communication path between the processor and the laser transmitter/receiver can also comprise a cordless communication path or a cable link.

In many cases it is preferable that the processor is located on the vehicle. In this case it presents few technical problems to construct the system in such a way that the system is provided with an indicator panel which is connected to the processor and on which information regarding the specific position of the location where the elongated object is to be introduced into the ground can be displayed, the indicator panel being located on the vehicle. In this case, the information on the panel is immediately available to the vehicle operator.

As has been mentioned above, the invention can advantageously be employed in the case of a mobile pile driving rig, drilling rig or similar installation, intended for introducing elongated objects such as piles, sheet piling elements, screw piles, pipes and the like into the ground. In this case it is preferable that the indicator panel is designed as a two-dimensional display panel on which the specific position of the location where the elongated object is to be introduced into the ground and/or the position of the vehicle as a whole is displayed as a marking which is superimposed on a plan of the predetermined area. This type of design is found to be very user friendly by the operators.

It is also preferable that means are present for marking at least one predetermined desired position on the plan which is shown on the display panel and that means are present for zooming in on the plan on the display panel to such an extent that it becomes possible for the vehicle operators, by manipulating the vehicle and/or the said parts which are determining for the position where the elongated object is to be introduced into the ground, to cause a desired position to coincide with the said determined position within a predetermined tolerance.

The invention will be explained in more detail below with reference to the appended figures.

FIGS. 5A–5E are related to one another.

FIG. 6 shows an embodiment of the system according to the invention with which neither the processor nor the laser transmitter/receiver are located on the vehicle.

Figure 1:
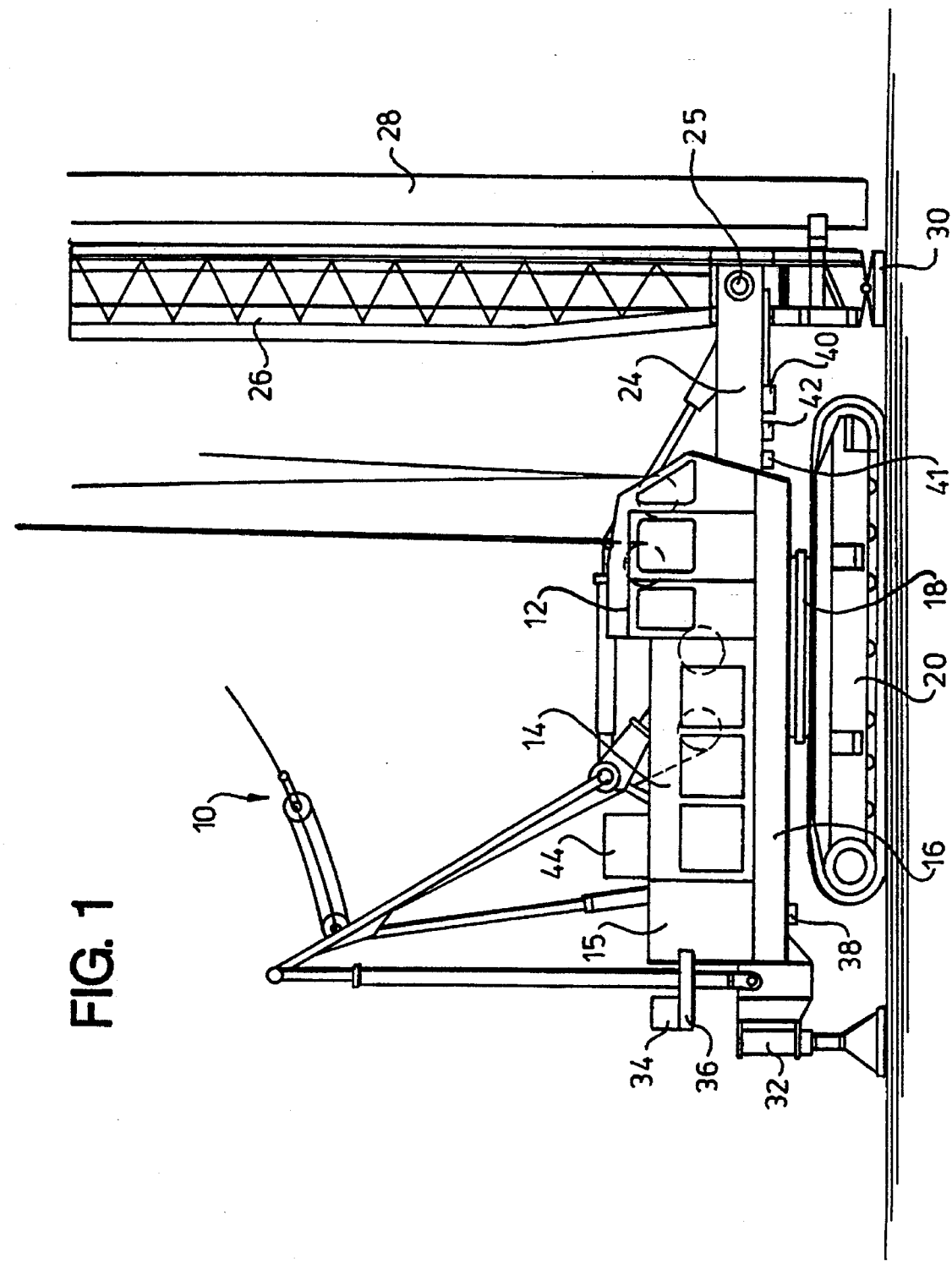
FIG. 1 shows part of a mobile pile driving rig with which the invention can be employed.

FIG. 1 shows a mobile pile driving rig, which is indicated in its entirety by 10. The pile driving rig is provided with a cabin 12, a generator unit 14 and a ballast block 15, which are positioned together on a frame 16. Via a pivot bearing 18, the frame 16 is positioned on a subframe 20 which can be moved by means of the caterpillar tracks 22. One end of an extending table 24 is mounted on the frame 16 such that it is able to rotate, whilst the other end of the extending table 24 is fixed via hinge 25 to the vertical pile guide 26, only part of which can be seen in the Figure. Part of a pile 28 can be seen next to the pile guide 26.

During normal operation, the pile driving rig is first driven on the caterpillar tracks 22 to the desired location. The vertical guide 26 is then manoeuvred into the desired position by, if necessary, turning the frame 16 with the aid of the bogie 18 and/or by sliding the extending table 24 further in or out. The pile guide 26 is then supported on its foot 30 and the entire rig is also fixed by means of one or more stabiliser legs, one of which, indicated by 32, can be seen in FIG. 1 at the rear of the pile driving rig. Following this positioning manoeuvre, driving of the pile 28 can start.

The installation described up to now is completely conventional and is assumed to be known to a person skilled in the art. Further details will therefore not be discussed.

The accuracy in the positions of the piles introduced into the ground is sometimes found to be clearly inadequate with the known pile driving rigs. Deviations of even a few decimeters can occur and such deviations can have a radical effect on the construction to be used for the subsequent building.

The position of the locations where the piles have to be introduced is determined by measurements with respect to a number of guide pegs, the position of which is determined with the aid of known measuring methods. Errors can be made when setting out the guide pegs. More significantly, however, the pegs can sometimes be dislodged after they have been set out and then put back by guesswork. Errors can also be made when positioning the pile with respect to the guide peg.

By application of the invention, the use of guide pegs is now avoided.

Within the scope of the invention, the pile driving rig known per se is provided with a rotary laser transmitter/receiver 34 which, in the illustrative embodiment shown, is fixed via a supporting element 36 to the ballast block 15. Furthermore, the rig is provided with a first spirit level 38 and a second spirit level 40. The first spirit level 38 is used to measure any inclination of the pile driving rig in the transverse direction and in the longitudinal direction, whilst the second spirit level 40 is intended to measure any inclination of the extending table 24 in the longitudinal direction of the rig. The rig is also provided with a length measuring device 42 with which the current length of the extending table is determined.

The spirit levels 38 and 40 are of a type with which analog or digital signals can be generated, depending on the inclination detected. "Electronic" spirit levels of this type are known per se to those skilled in the art and therefore require no further discussion.

The length measuring device 42 is also of a type with which analog or digital signals can be generated, depending on the length determined at the particular point in time. "Electronic" length measuring devices of this type, for example in the form of electronic measuring tapes, are likewise known per se to those skilled in the art and therefore require no further detailed explanation.

Preferably, the rig is also provided with at least one temperature probe 41, which, for example, can be mounted on the extending table 24 and which is intended to measure the temperature of the extending table. The pile driving rig must be able to operate at substantially varying temperatures. However, because the dimensions of various parts of the rig, such as the extending table 24, the frame 16 and the pile guide 26, are temperature-dependent, it is preferable, in connection with the target accuracy, also to have available information regarding the current temperature of the various parts of the pile driving rig. Optionally, several temperature meters can be installed on various parts of the rig for this purpose.

The laser transmitter/receiver 34 can, for example be of a type which is described in detail in U.S. Pat. No. 5,076,690, which has already been mentioned above. With the aid of said laser transmitter/receiver 34 it is possible accurately to determine the location of the transmitter/receiver with respect to a number of reflectors which are located around the building site. Not only the location can be accurately determined; the angular position with respect to an imaginary reference line which is determined by the positions of the various reflectors can also be established; in other words the direction of the longitudinal axis of the pile driving rig as a whole can be determined with the aid of the laser transmitter/receiver. The information regarding position which is generated in the laser transmitter/receiver 34 is supplied to a computer 44, which in FIG. 1 is located in a separate housing on top of the generator unit 14. Said computer could also be set up in the cabin or in another suitable location. The signals from the first spirit level 38, the second spirit level 40, the optional temperature probes 41 and the length measuring device 42 are also supplied to said computer.

A display panel 48 and an input unit 46, for example in the form of a joystick, tracker ball or something similar, which is to be operated by the pile driving rig operator, are located in the cabin 12 of the pile driving rig. Neither can be seen in FIG. 1 but both are shown diagrammatically in FIG. 2.

Figure 2:
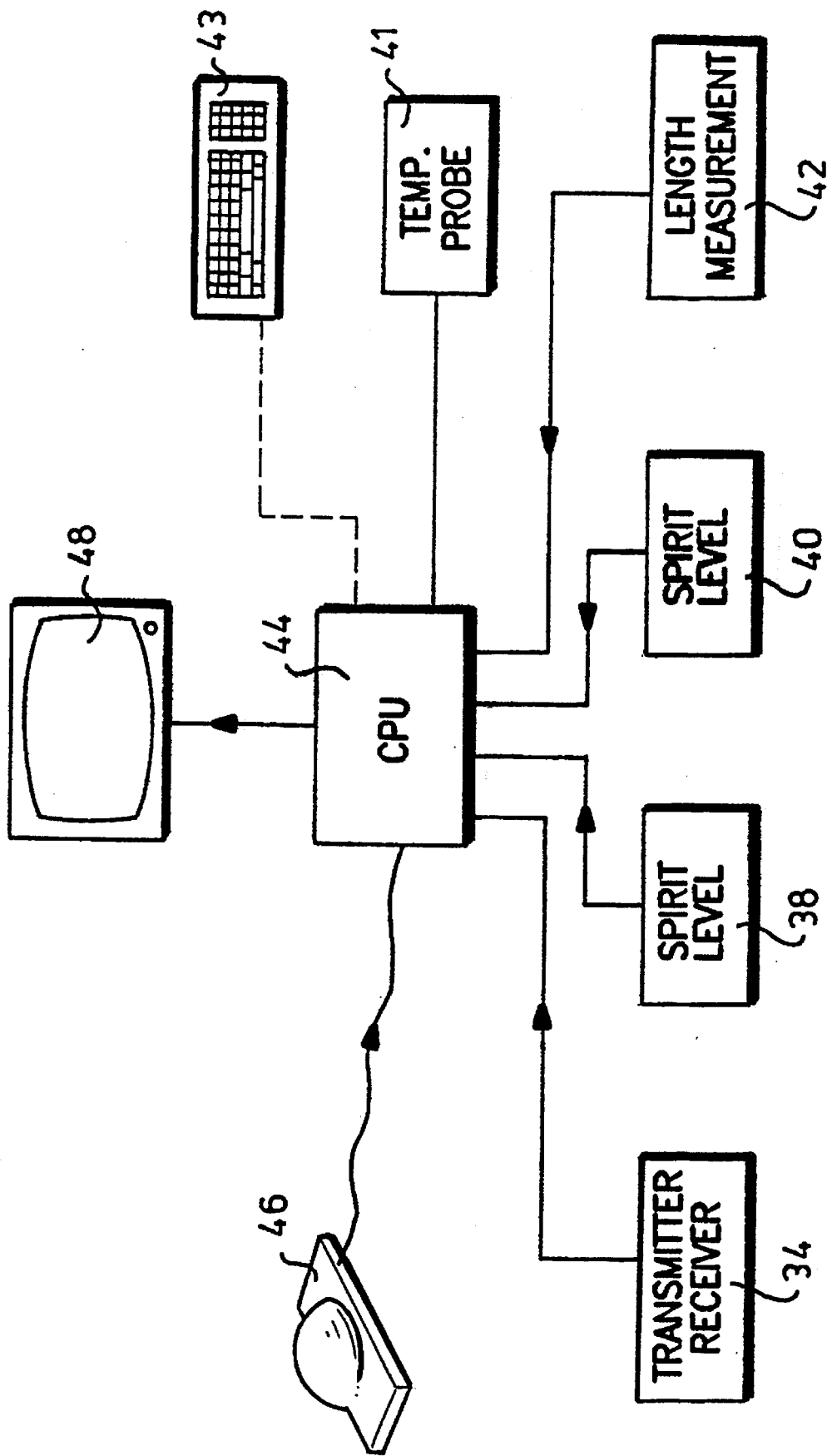
FIG. 2 shows, in the form of a block diagram, the means which form part of a preferred embodiment of the system according to the invention.

FIG. 2 shows, in the form of a block diagram, the means which form part of a preferred embodiment of a system according to the invention. The computer 44, in the middle of FIG. 2, receives data regarding the coordinates X, Y and Z relating to the actual position of the laser transmitter/receiver 34 from said laser transmitter/receiver. The spirit level 38 supplies data with regard to any angle of inclination in the longitudinal direction of the frame 16 and the direction perpendicular thereto, and the spirit level 40 supplies data with regard to any inclination of the extending table 24 in the lengthwise direction of the pile driving rig 10. The length measuring device 42 supplies data with regard to the current length L of the extending table 24.

As an option, a keyboard 43 can be connected to the processor, which keyboard can be used, for example, to program the processor. As a further option, the processor could be coupled to a floppy disk memory, a hard disk memory or another memory medium for mass storage. In view of the fairly harsh environment in which the processor has to carry out its task, it is however, preferable as far as possible to restrict the number of peripherals during operation.

Furthermore, data relating to a number of additional fixed dimensions of the rig are stored in the memory of the computer. These dimensions have to be entered and stored in the memory once, when the system is installed. If present, the temperature probes 41 then supply data relating to the current temperature of one or more parts of the rig for which the accurate dimensions are temperature-dependent and therefore can be affected.

It will be obvious to a person skilled in the art that the relative position of the foot of the pile 28 immediately above the ground with respect to the location of the laser transmitter/receiver 34 can be calculated with the aid of all of these data. As the absolute position of the laser transmitter/receiver with respect to the reflectors located on the site is known, the absolute position of the foot of the pile 28 is therefore also known. A suitable program for carrying out the necessary calculations is loaded in the computer 44 during operation and this program will be discussed in more detail below.

During operation, the laser transmitter/receiver 34 continuously determines its own position with respect to the various reflectors. In this operation, in particular the angle with respect to each of the reflectors is determined and the X, Y and Z coordinates of the current position of the laser transmitter/receiver 34 are determined immediately from the combination of incoming signals. These data are read out by the computer 44 and entered into a drawing program, such as, for example, AutoCad. With the aid of this drawing program, as is still to be discussed below, a plan of the entire building site is drawn on the screen 48 in the cabin 12 and the position of the pile driving rig 10 is indicated on said plan on the basis of the X and Y coordinates measured by the laser transmitter/receiver 34.

Figure 3A:
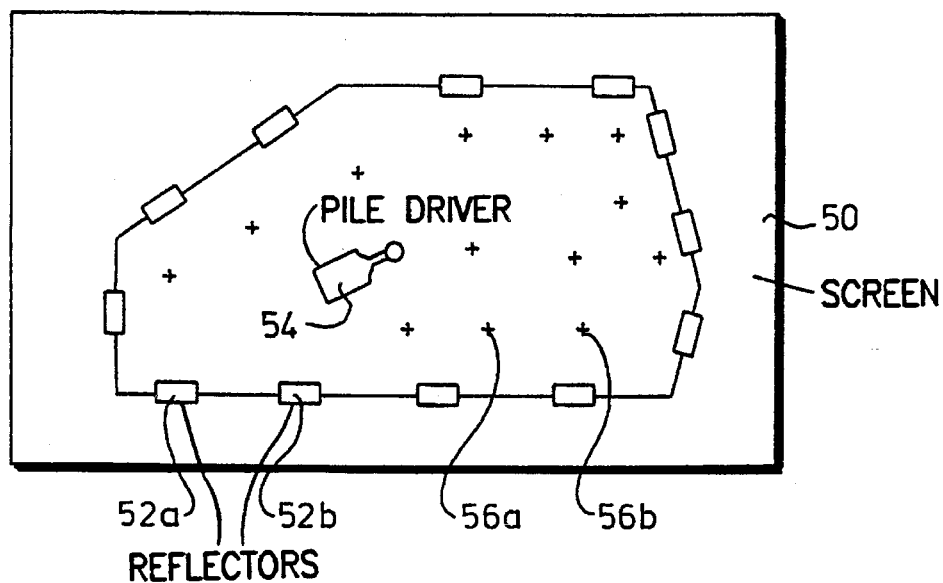
FIG. 3 shows, in a number of views a, b and c, an example of the way in which the data which are determined by the system can be displayed on the display screen to the operator of the pile driving rig.

FIG. 3a shows, diagrammatically, and example of the way in which the position data can be displayed to the pile driving rig operator. A plan of the entire building site with the laser reflectors located on the site individually marked is first shown on the screen 50 of the display unit 48. In FIG. 3a said laser reflectors are indicated as small rectangles 52a, 52b ... 52x. If a sufficiently large number of reflectors is used, the laser transmitter 34 is then not only capable of determining its own position with respect to the reflectors, but the position of every reflector with respect to the other reflectors can also be determined, assuming that at least a few reference data are known. Should a reflector be removed from its position temporarily, the new position can be "calibrated" easily when the reflector is replaced.

The laser transmitter/receiver 34 not only calculates the current x and y coordinates of its own position, but also calculates the direction of the longitudinal axis of the pile driving rig. It is therefore possible to show the pile driving rig on the screen display in the form of a symbol which shows which is the front and the rear of the pile driving rig and at which point the pile guide 26 or the pile 28 is located. Such a symbol 54 is shown on the screen 50 in FIG. 3a by way of example.

Figure 3B:
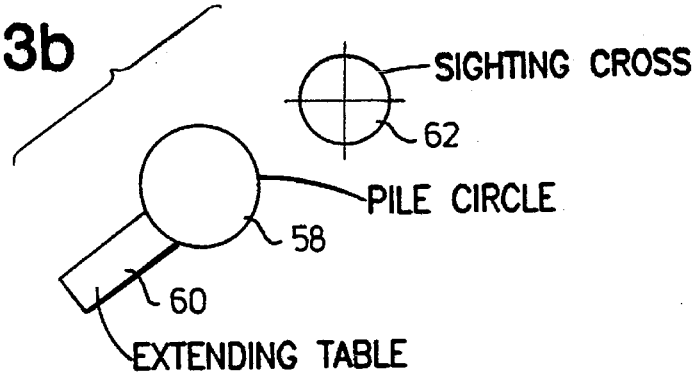

In addition to the current position of the pile driving rig, the locations in which piles have to be placed are also indicated on the screen by means of suitable indicators, for example crosses 56a, 56b ... 56x. The crane driver therefore sees on the screen the desired position for the piles still to be placed and, on the other hand, the current position of the pile driving rig. With the aid of the joystick or tracker ball 46, the operator selects the pile he wishes to place in position. On the basis of the screen, the operator now drives the rig 10 to the position where the next pile has to be driven. The software which is loaded in the computer 44 preferably functions in such a way that it automatically zooms in on the image on the screen when the selected position is approached. In particular the measured values, generated by the spirit levels 38 and 40, by the length measuring device 42 and by any temperature probes 41 which are present, now also start to play an important role. The measured values transmitted by said sensors are also supplied to the computer 44 and processed therein together with the signal from the laser transmitter/receiver 34 in order to calculate the precise location of the centre of the foot of the pile 28 in the rig. Said calculated centre position of the pile 28 is, for example, displayed on the screen as a circle 58 at the end of the symbol indicating the extending table 60, in the manner shown in FIG. 3b. At the same time, the desired position where the new pile has to be driven is shown, for example, as a sighting cross 62. The operator must now ensure that the sighting cross is brought into line with the pile circle 58. As soon as this is the case, the pile driving rig is fixed by means of the stabilizer legs 32 or, optionally, other means present for this purpose and the next pile 28 is driven.

Figure 3C:
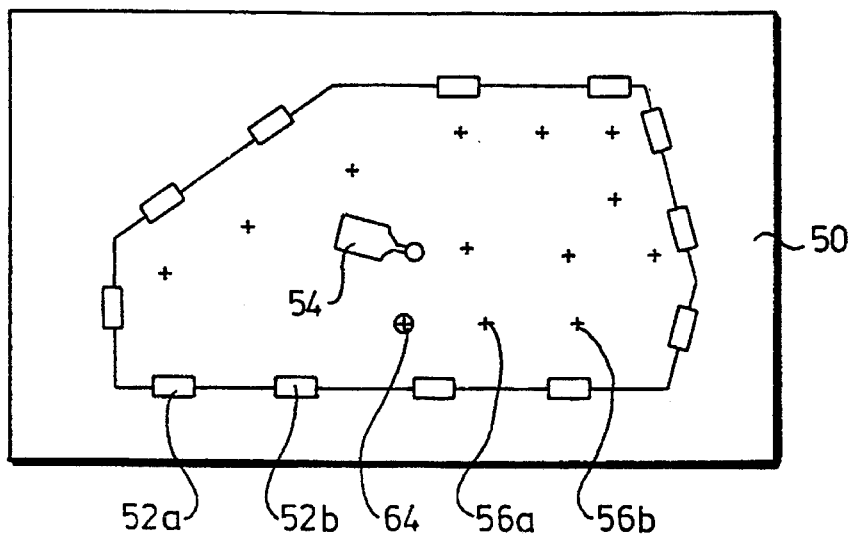

After the pile has been installed, the operator uses the joystick 46 to report this to the computer 44, which then labels the pile in the program as "present" and changes the marking for the pile concerned in such a way that this fact is clear to the observer, for example in the manner which is shown at 64 on the screen in FIG. 3c. The final position of the pile is now logged, as a result of which any deviation from the planned position has been established.

After installation of the pile, the operator selects a new pile and drives the rig in the direction of the new pile position. As soon as the rig is within a sufficiently short distance, the computer automatically zooms in again on the screen and the operator is able to bring the new pile 28 accurately above the desired position. Following installation, this pile also is labelled as "present" and the operator can continue with the next pile.

The actual position of each pile which has been determined in the meantime is stored in a file by the software. Once all piles have been driven into their positions, this entire file can be handed over to the contractor, who thus accurately knows where the piles are located and, moreover, has a means of evidence and checking, which shows that the work has been carried out in accordance with the specification. As has been found in trials in practice, the accuracy which can be achieved with this system is, incidentally, of the order of 5–10 mm.

In the ideal case, the laser transmitter/receiver 34 would have to have a 360° field of view. Moreover, the unit 34 must always be horizontal, irrespective of any inclination of the pile driving rig itself. An uninterrupted 360° field of view would demand that the laser transmitter/receiver has to be placed on top of the hanging post at the top of the pile guide 26. Although such a position is one of the possibilities, it is not very handy in practice. Therefore, in a practical set-up, a position has been chosen on a corner at the rear of the rig, as is illustrated in FIG. 1. In this position, the unit 34 has a field of view of 270° and in combination with a sufficient number of reflectors around the boundary of the site it proved to be possible with this arrangement to be able to determine the position of the unit 34 with the desired accuracy.

In order to guarantee that the unit 34 is always in the horizontal position, it is preferable to use a cardan mounting for the unit 34. Cardan mounting mechanisms of this type are known per se and a detailed description thereof is therefore also considered superfluous in the context of the invention.

Figure 4:
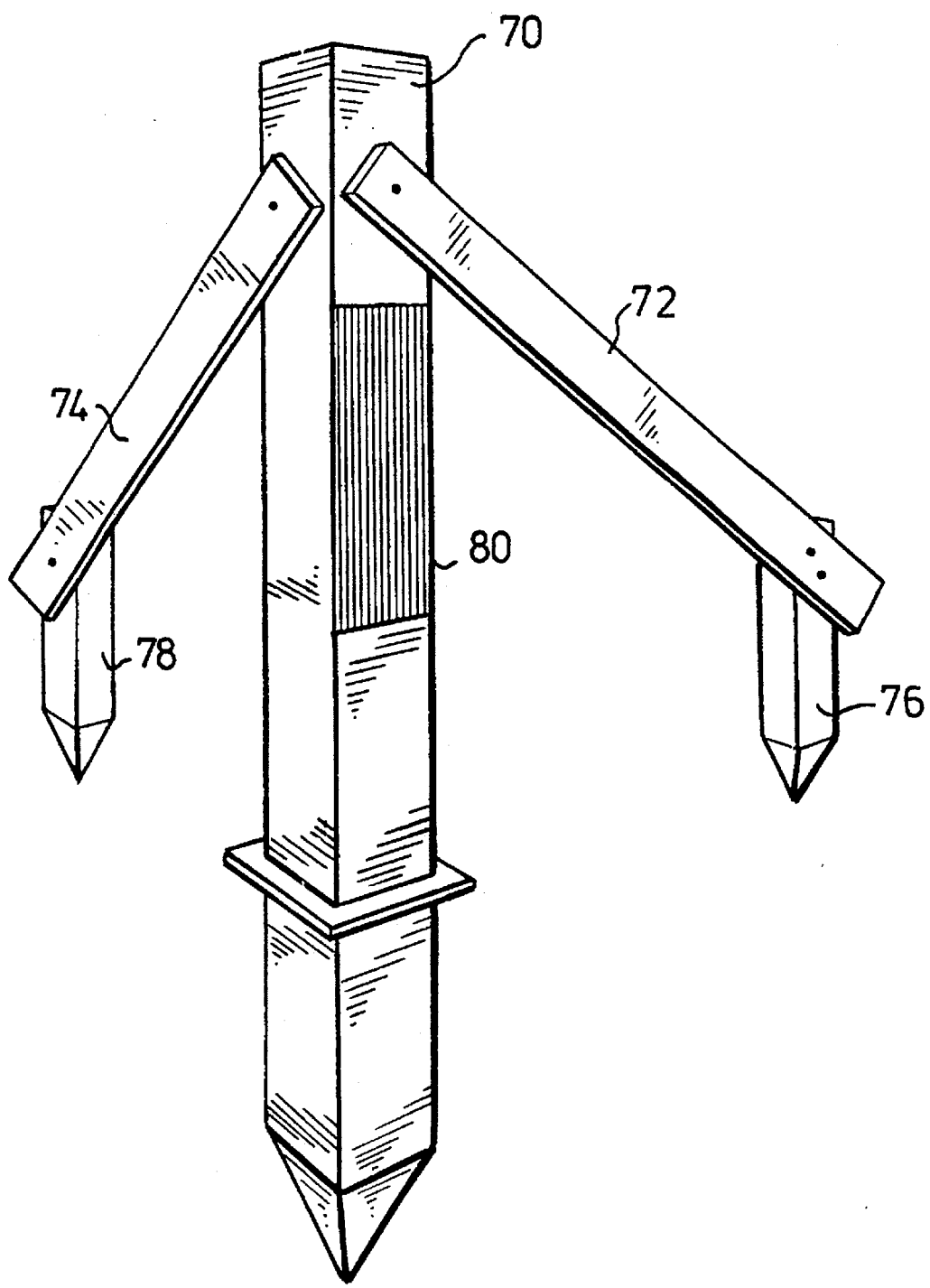
FIG. 4 shows an embodiment of a laser reflector.
Figure 5A:
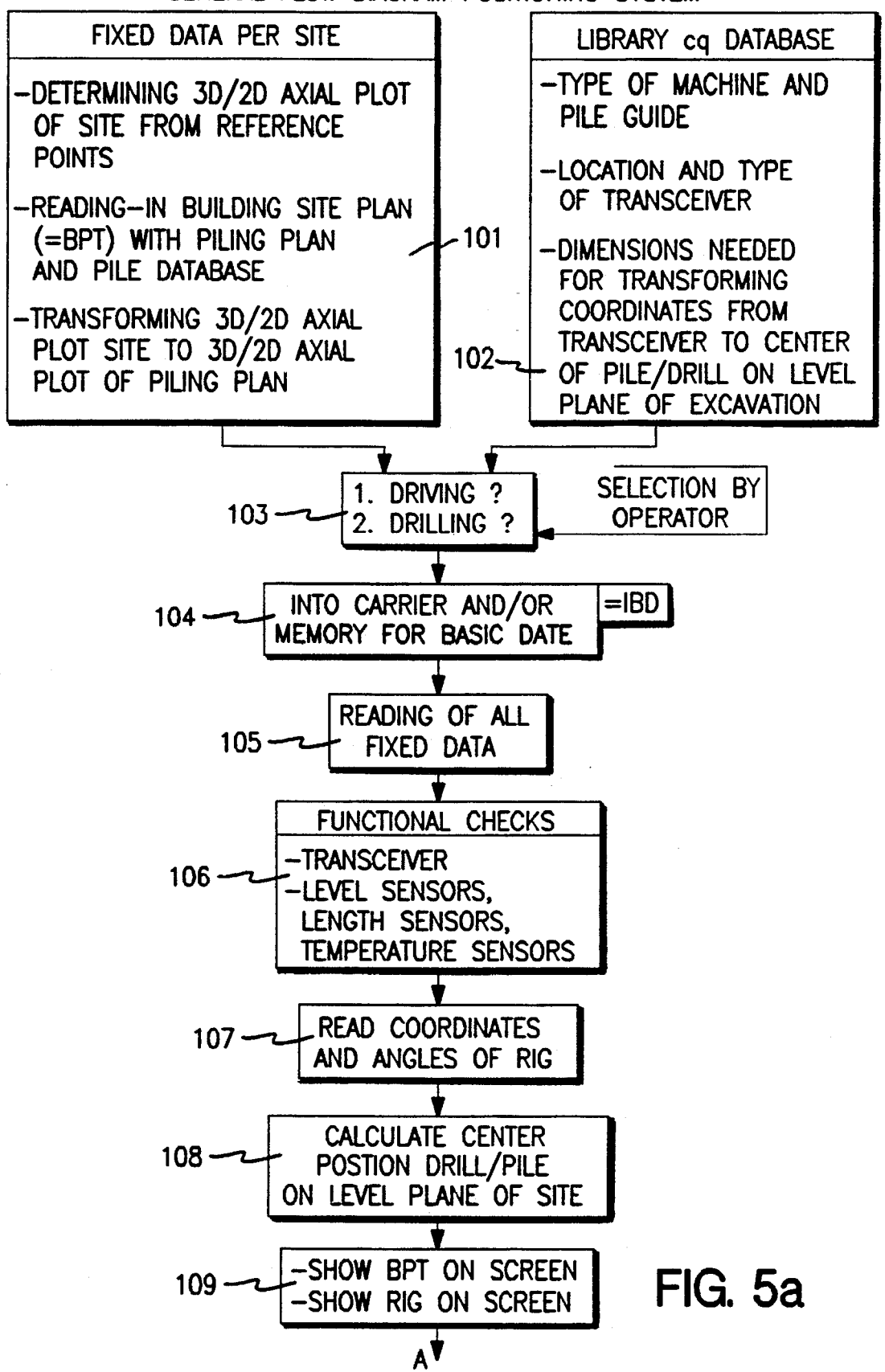
FIGS. 5A–5E show a flow chart of the way in which the system functions during operation.
Figure 5B:
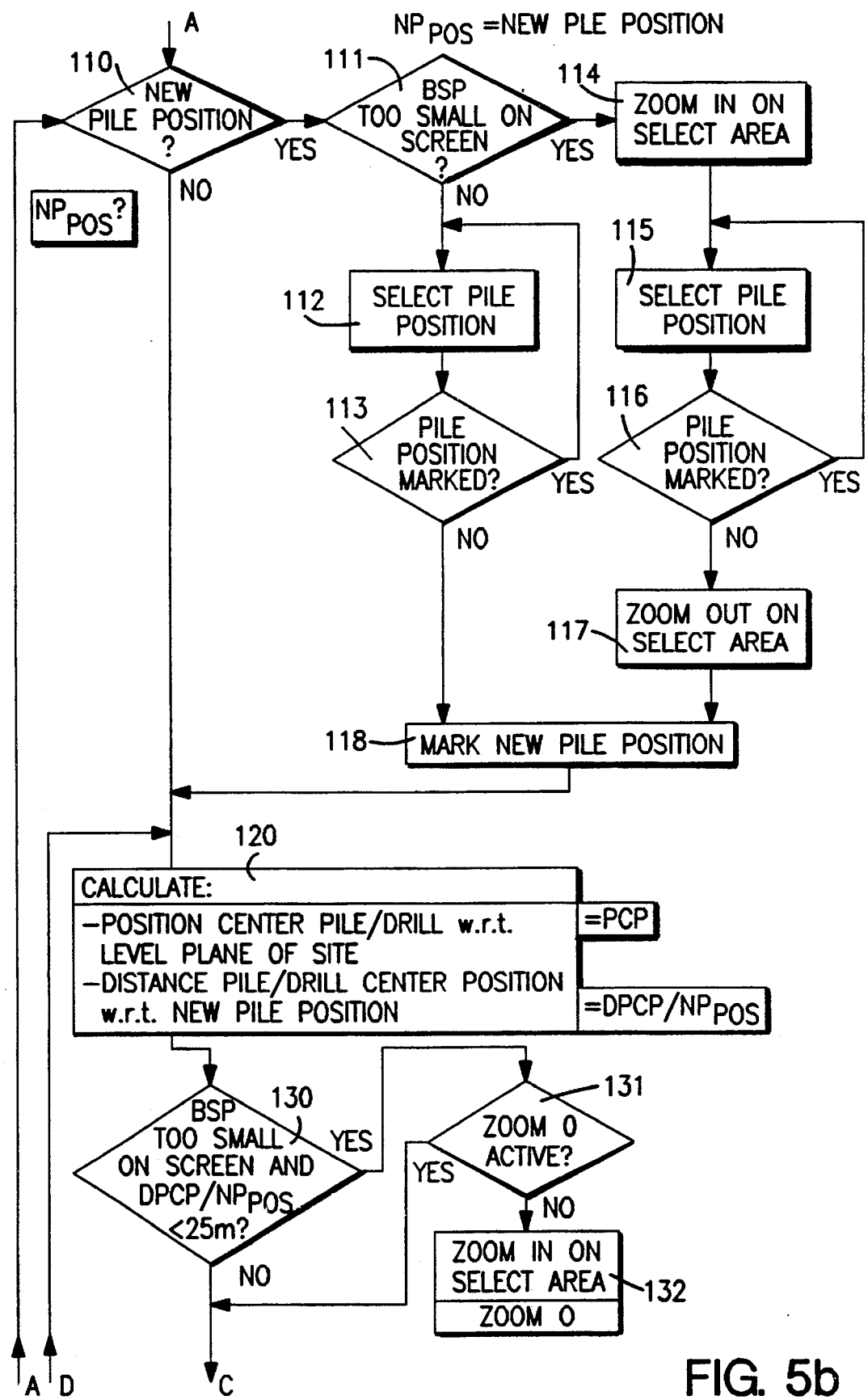
Figure 5C:
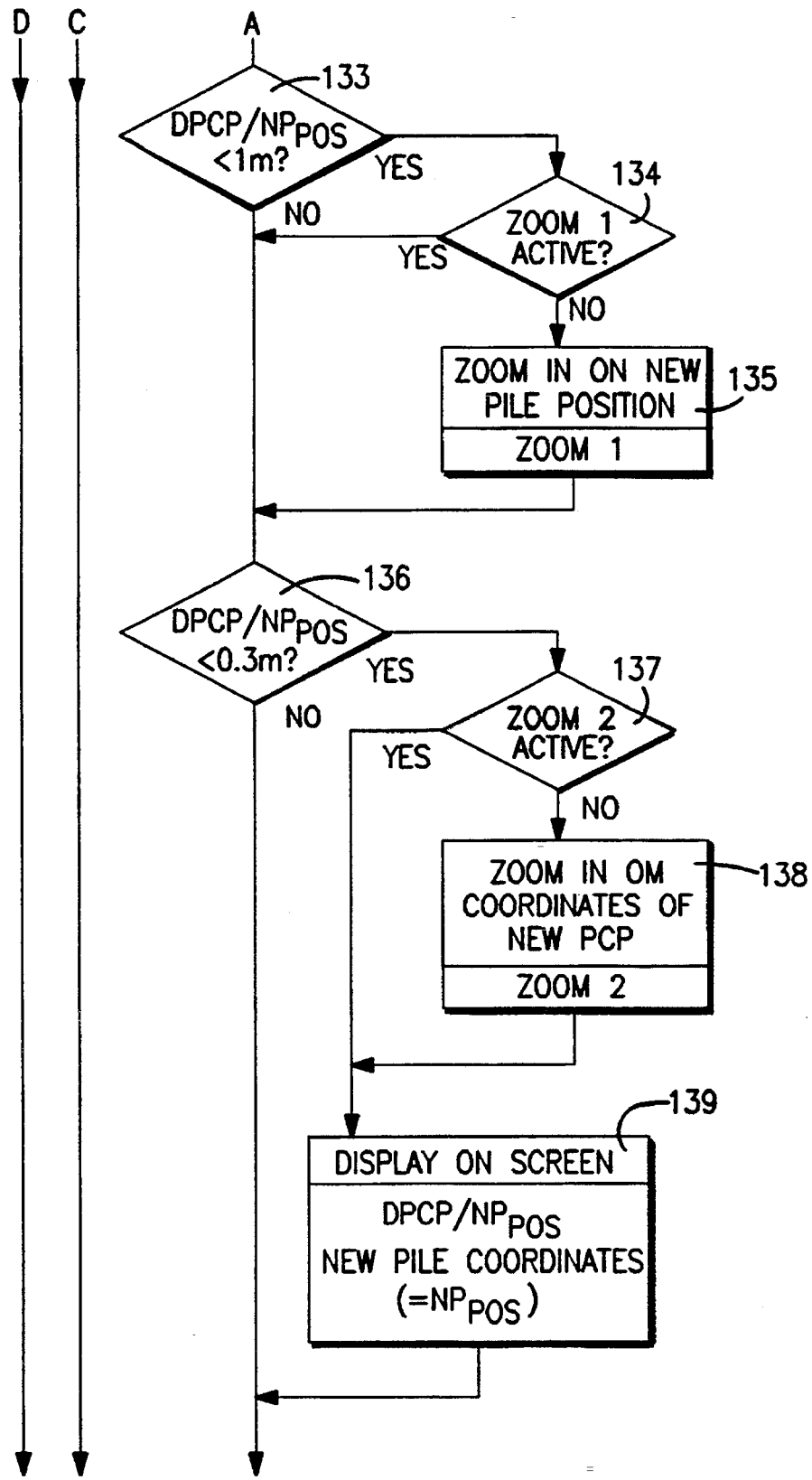
Figure 5D:
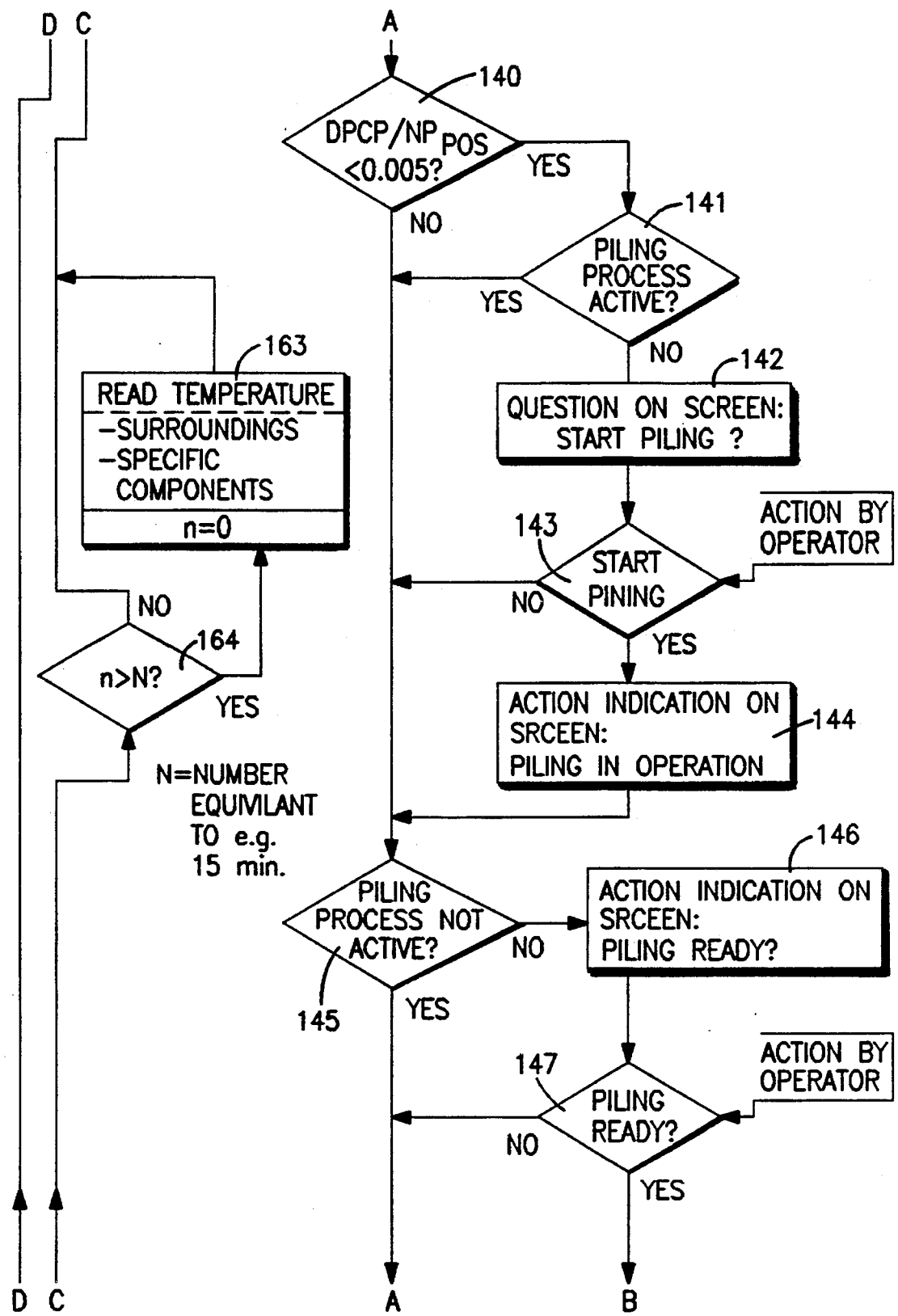
Figures 5E, 5F:
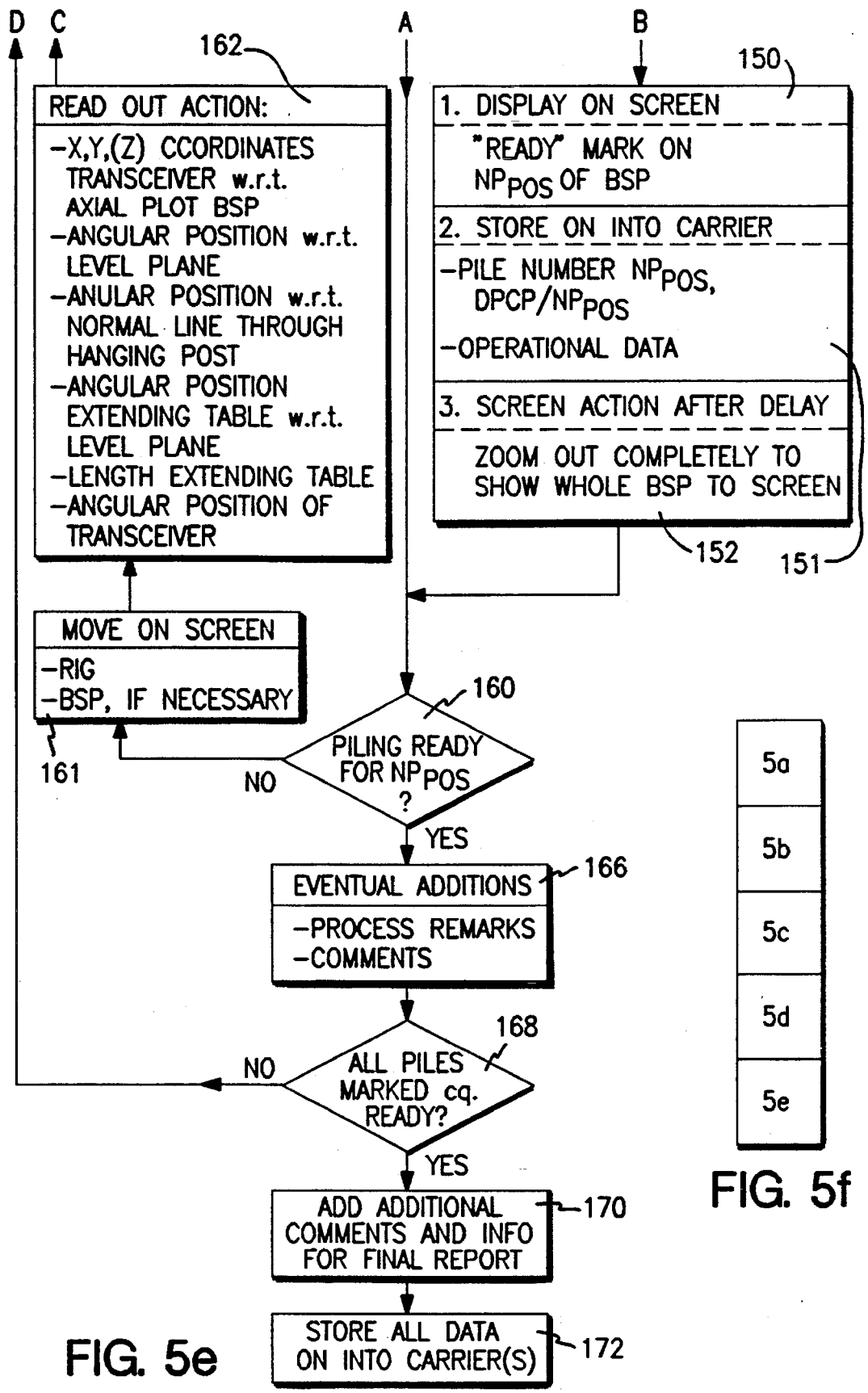
FIG. 5F shows how

The reflectors which are located around the boundary of the site preferably consist of posts which are placed vertically in the ground. FIG. 4 shows an example in which the actual reflector post 70 can be positioned vertically with the aid of two props 72 and 74 and two guide pegs 76 and 78 in a manner such as is customary in the building world. Reflecting material 80 is present on the post 70, which reflecting material is applied as vertical strips parallel to one another, in such a way that a coded reflection signal is received during scanning by the horizontally rotating laser beam. By choosing a different pattern of reflecting strips for each reflector, different coded signals are obtained for each post, from which the laser transmitter/receiver 34 is therefore able to recognise the post concerned. The use of reflectors coded in this way is, incidently, also already described in the above-mentioned U.S. Pat. No. 5,076,690.

Although theoretically only three reflectors outside and/or inside the building site can suffice, it is preferable to use a larger number of reflectors, certainly if the laser transmitter/receiver 34 is mounted in the manner shown in FIG. 1 such that it does not have a complete 360° field of view. Practical trials have shown that it is preferable to arrange the reflectors such that, if the laser transmitter/receiver should be located approximately in the middle of the building site, one reflector is visible about every 30°. In other words, if the building site is regarded as circular, it is preferable to place 12 reflectors approximately equal distances apart around the boundary of the building site. Under all circumstances, the laser transmitter/receiver 34 then has an adequate number of reflectors within its field of view to be able to establish the position of the pile 28 with the desired accuracy.

The functioning of the entire system will be discussed again in more detail below with reference to a flow chart, which is shown in FIGS. 5A–5E.

In block 101 a number of fixed data per building site are recorded. This relates to the determination of the two-dimensional of three-dimension axial plot of the building site from a number of reference points, reading-in of the building site plan, designated BSP below, together with the piling plan, and also all data relating to the piles, and a transformation of the two-dimensional or three-dimensional axial plot of the building site into the two-dimensional or three-dimensional axial plot of the building site plan.

Block 102 indicates which fixed data relating to the rig used have to be known to the system. These data relate to the type of machine and the pile guide or hanging post, the location and the type of the laser transmitter/receiver and a specification of the dimensions which are needed for transformations of coordinates from the transmitter/receiver to the centre of the pile/drill with the level plans of the excavation.

In block 103 the operator of the pile driving rig has to choose between driving or drilling. Where the data have to be stored and/or retrieved from is then determined in block 104 and subsequently, in block 105, the chosen medium is used to actually store or retrieve all data relating to the building site and the pile driving rig.

The functioning of a number of components of the rig, such as correct functioning of the laser transmitter/receiver, the spirit levels, the length measuring device for extending table and, if present, the temperature sensors, is then checked in block 106.

In block 107 the current position of the rig is determined and in block 108 the position of the centre of the pile/drill, which is carried by the rig, on the level plane of the excavation is calculated. In block 109 the building site plan BSP is displayed on the screen and the current position of the rig is also shown on this plan.

In query block 110 the question is posed as to whether the pile position concerned is a new pile position or not. If it is not a new pile position, the procedure continues at block 120; and if it is a new pile position, the procedure continues at block 111. In the last-mentioned block a check is made to establish whether the display on the screen is adequate or not. If the display on the screen is adequate, a new pile position must then be selected in block 112, and in block 113 a check is made to establish whether this selection has in fact been made. If not, the program loops back to the block 112 until such time as the new pile position has been marked. As soon as this has been done, action is taken in block 118 to mark the selected pile position on the screen.

If it is established in block 111 that the display on the screen is too small, zooming-in is first activated in block 114, after which the pile position must then be selected in the loop in which blocks 115 and 116 are incorporated. Then, in block 117, the screen display is first returned to normal by zooming out, after which, in block 118, the pile selected via this route is marked on the screen.

In block 120, the current position of the centre of the pile or of the drill with respect to the level plane of the excavation is calculated and, in addition, the distance between said centre and the new pile position is calculated.

Subsequently, during movement of the pile driving rig to the correct position, the display is gradually zoomed in in such a way that the operator of the pile driving rig is able, on the basis of the image which is displayed on the screen, accurately to position the rig at the desired new pile position.

Block 130, in which a check is make to determine whether the distance away from the new pile position is greater of smaller than 25 meters, is at the start of this zooming-in procedure. If the distance is less than 25 meters, a check is make in block 131 to determine whether the first zooming position "zoom 0" has already been activated. If this is not the case, said zoom position is activated in block 132. Subsequently, a similar process is carried out in blocks 133, 134 and 135, checks now being made to determine whether the distance away from the new pile position is less than 1 meter and, if this is the case, the next zoom position "zoom 1" is then activated if necessary. This process is repeated again in blocks 136, 137 and 138. The distance between the position of the centre of the pile and the new pile position is now less than 30 cm and, to assist the operator of the rig, the coordinates of the new pile position and the distance which still has to be travelled to reach said position are now displayed on the screen.

If the operator has manoeuvred the rig into a position such that the distance away from the new pile position is less than 5 cm, the question in block 140 will be answered by "yes". In block 141 a check is made to determine whether the driving process was already active and, if not, the operator is then presented, in block 142, with the question on screen "Start driving?". In block 143 the system pauses until an answer is given by the operator. If the operator elects to start the driving process, this will be displayed on the screen in block 144.

During the driving process, the procedure continues to cycle in the blocks 145, 146 and 147. As long as the driving process is active, this loop is followed until the operator indicates that the process is complete. In this case, the question in block 147 is answered by "yes" and the process will continue with the combination of blocks 150, 151 and 152. In block 150 a marker will be displayed on the screen which indicates that the driving process at the location concerned is complete. In block 151 it is ensured that the data for the pile which has just been driven are stored on an information carrier, such as the IBD, and in block 152 it is ensured that the display on the screen is restored to the initial position, in other words the display is zoomed out again to the full extent such that the complete building site plan can be seen on the screen again. In block 160 the question is posed as to whether the driving process for the new pile position has been carried out. The answer in this block is "no" during the phase in which the operator is engaged in moving the pile driving rig to the new position, the distance between the centre of the pile and the new position not yet having become smaller than 5 cm. In this case the process continues with block 161, in which measures are taken for ongoing correction of the position of the rig on the screen.

Subsequently, in block 162, a readout is given of all current measurement data from the laser transmitter/receiver, from the various spirit levels and from the length measuring device, on the basis of which, in block 120, the new current position can then be calculated.

If temperature probes are present, the values from these are read out in block 163. In order to prevent very small and minor corrections having to be made every time, said temperature data are read out only at preset intervals, for example at an interval of 15 minutes. Block 164, in which a check is make to determine whether the relevant interval has elapsed, serves for this purpose If the question in block 160 is answered by "yes", the operator, or some other person, has a facility, in block 166, for appending any remarks or further comments to the stored data. Subsequently, a check is made in block 168 that all piles have been driven. If not, the process returns to block 110. If all piles have been driven, block 170 offers the facility for appending any concluding remarks to the data and thereafter, in block 172, all data are stored.

Although the application of the invention has been discussed above with regard to a pile driving rig for driving in a pile, it will be clear that the invention can also be used for rigs for driving sheet piling elements into the ground, for drilling holes, for driving in pipes, etc.

Moreover, in the above an illustrative embodiment of the system has been described with which both the laser transmitter/receiver and the processor are located on a pile driving rig. However, it is also possible within the scope of the invention to site the laser transmitter/receiver and the processor separately from the pile driving rig somewhere in the site, in which case suitable communication links, for example cordless links, must be present for data transfer. An embodiment of such a system is illustrated diagrammatically in FIG. 6.

FIG 6 shows, diagrammatically, a plan of a site on which six laser reflectors 200A, 200B . . . 200F are positioned. The laser transmitter/receiver 202 and the mobile pile driving rig 203, both shown only diagrammatically in said figure, are also located on the site. The mobile pile driving rig 203 is provided with a laser reflector 201 and is also provided with a radio transmitter 204, which is coupled to the various sensors, such as the spirit levels, length measuring device, temperature sensors and the like, which are not shown individually in the figure.

A processor 205, which is coupled to an indicator unit or display panel 208, is also present on the site. The data relating to position, which are collected by the laser transmitter/receiver 202, are transferred to the processor 205 via a communication link 206, for example a radio link and/or light link and/or cable connection. Via a further communication link 207, for example a radio link and/or light link, the data measured by the various sensors are transferred by means of the transmitter/receiver 204 on the pile driving rig 203 to the processor 205. It is also possible, for example, for a further indicator unit or display panel 208' (not shown in the figure) to be located in the operator's cabin, which unit has the same function as indicator unit 208 and, as it were, is coupled thereto. The communication link 207 to transmitter/receiver 204 can also be used for the communications with said indicator unit 208', which is located on or in the vehicle.

The functioning of this entire system is, in fact, identical to the functioning of the system already described above in this Application. The embodiment in FIG. 6 is particularly suitable for use with vehicles which are remotely controlled via further radio links.

In another embodiment, which is not shown separately in the figures, it is possible, on the one hand, to site the laser transmitter/receiver independently on the site and to accommodate the processor, together with the indicator panel, in the vehicle. The advantage of such an arrangement is that the laser transmitter/receiver can be moved if appropriate, if this is desirable in connection with the building work or the further developments on the site. After moving to a new location, it is necessary merely to determine once again the new position of the laser transmitter/receiver with respect to the reflectors 200A . . . 200F in a separate calibration procedure, after which the entire system can again be used for further positioning of the vehicle. The positioning of the vehicle can then again be carried out by staff who have the requisite data available in the cabin of the vehicle.

We claim:

1. System for positioning a vehicle within a predetermined area, which system is provided with a laser transmitter/receiver and three or more laser reflectors which are located outside and/or inside the predetermined area, the position of the laser transmitter/receiver with respect to the laser reflectors being determined continuously with the aid of a method known per se, characterised in that the vehicle is provided with movable parts with which predetermined work can be carried out, the position of a reference point on the vehicle with respect to the laser reflectors is determined continuously with the aid of the laser transmitter/receiver, the vehicle is provided with sensors with which the position of a number of movable parts of the vehicle is measured continuously, which parts are determining for the relative position, with respect to the reference point, of the location where the said work is carried out, a processor is present, which is designed and/or programmed in such a way that said processor processes the output signals from the said sensors and from the laser transmitter/receiver and on the basis of said signals determines the position of the location where the work is being carried out, with respect to the laser reflectors, and there is a communication link between the sensors on the vehicle and the processor for the transfer of measured values from the sensors to the processor and in that there is a communication link between the laser transmitter/receiver and the processor for the transfer of measured values between the laser transmitter/receiver and the processor.

2. System according to claim 1, characterised in that the vehicle is provided, at the reference point, with a laser reflector, and in that the laser transmitter/receiver is located at a predetermined position from where it is able to direct radiation onto an adequate number of laser reflectors in order to be able to determining the position of the laser reflector at the reference point from the measured values obtained.

3. System according to claim 1, characterised in that the laser transmitter/receiver is located at the said reference point on the vehicle.

4. System according to claim 1, characterised in that the communication link between the sensors on the vehicle and the processor for the transfer of measured values from the sensors to the processor is formed by a cordless communication path.

5. System according to claim 1, characterised in that the communication link between laser transmitter/receiver and the processor is formed by a cordless communication path.

6. System according to claim 1, characterised in that the processor is located on the vehicle.

7. System according to claim 1, characterised in that the system is provided with an indicator or display panel which is connected to the processor via a communication link and on which information relating to the specific position of the location where the predetermined work is to be carried out can be displayed and, also, one or more specific positions can be indicated before the specific work is started.

8. System according to claim 1, characterised in that the communication link between the processor and the indicator unit is formed by a cordless communication path.

9. System according to claim 7, characterised in that the indicator panel is located on the vehicle.

10. System according to claim 1, characterised in that the processor also provides information relating to the position of the vehicle as a whole on the basis of the output signals from the laser transmitter/receiver.

11. System according to claim 7, characterised in that the vehicle constitutes a mobile pile driving rig, drilling rig or similar installation, intended for introducing elongated objects such as piles, sheet piling element, screw piles, pipes and the like, into the ground.

12. System according to claim 11, characterised in that the indicator panel is designed as a two-dimensional display panel on which the specific position of the location where the elongated object is to be introduced into the ground and/or the position of the vehicle as a whole is displayed as a marking which is superimposed on a plan of the predetermined area.

13. System according to claim 12, characterised in the means are present for marking at least one predetermined desired position on the plan which is shown on the display panel.

14. System according to claim 13, characterised in the means are present for zooming in on the plan on the display panel to such an extent that it becomes possible for the vehicle operators, by manipulating the vehicle and/or the said parts which are determining for the position where the elongated object is to be introduced into the ground, to cause a desired position to coincide with the said determined position within a predetermined tolerance.

15. System according to claim 1, characterised in that means are present in order, after an elongated object has been introduced into the ground, to display a marker on the screen which indicates that an elongated object has been introduced into the ground at the position concerned.

16. System according to claim 1, characterised in that the vehicle is provided with angular position detectors, with which the angular position or inclination of the vehicle with respect to the horizontal plane is determined in at least two mutually perpendicular horizontal directions.

17. Systems according to claim 1, characterised in that the laser transmitter/receiver is mounted on top of or on the vehicle a relatively large distance away from the guides for the elongated object, such that the laser transmitter/receiver has a field of view of at least 180 degrees and preferably at least about 270 degrees, and in that the number of laser reflectors and the location thereof is chosen such that the laser transmitter/receiver is capable of determining the position of the vehicle with sufficient accuracy in every location within the area and in every position of the vehicle.

18. System according to claim 1, characterised in that the vehicle is provided with detectors with which any angular position of the guides for the elongated object with respect to the vertical can be determined.

19. System according to claim 1, characterised in that the number of laser reflectors is at least one higher than the minimum number theoretically required in order to determine the position of the vehicle.

20. System according to claim 1, characterised in that the system is provided with a memory in which the data relating to a number of specific positions where an elongated object has been introduced into the ground can be stored.

21. System according to claim 19, characterised in that, following introduction of an elongated object, the position thereof is calculated once again and the data resulting from this calculation are stored in the memory.

* * * * *